T. J. MARTIN.
AUTO DOOR ANTIRATTLING DEVICE.
APPLICATION FILED FEB. 6, 1920.
1,344,644.
Patented June 29, 1920.
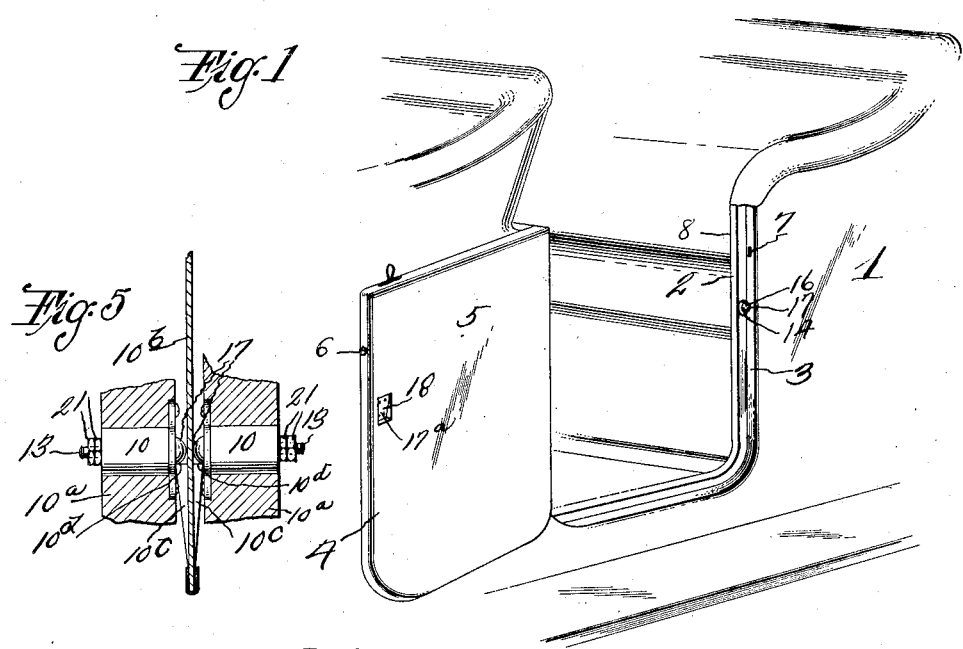
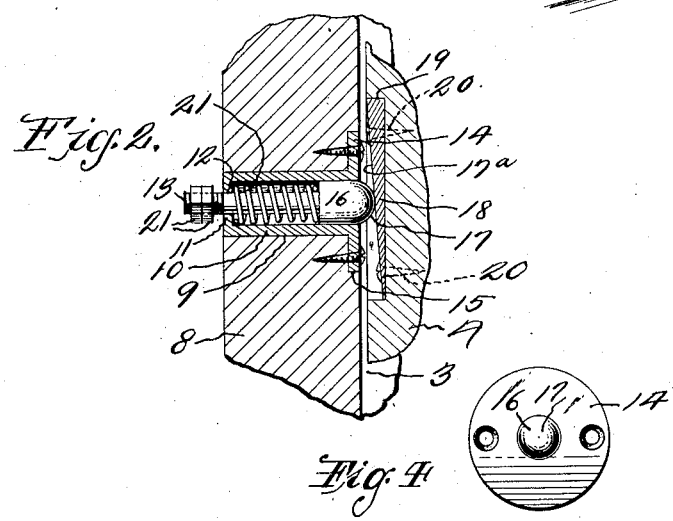
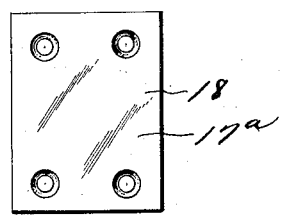
Inventor
T. J. Martin
By D. Swift
Attorney

UNITED STATES PATENT OFFICE.

TRUMAN J. MARTIN, OF ALLENTOWN, PENNSYLVANIA.

AUTO-DOOR ANTIRATTLING DEVICE.

1,344,644.  Specification of Letters Patent.  Patented June 29, 1920.

Application filed February 6, 1920. Serial No. 356,617.

*To all whom it may concern:*

Be it known that I, TRUMAN J. MARTIN, a citizen of the United States, residing at Allentown, in the county of Lehigh, State of Pennsylvania, have invented a new and useful Auto-Door Antirattling Device; and I do hereby declare the following to be a full, clear, and exact description of the invention, such as will enable others skilled in the art to which it appertains to make and use the same.

The invention relates to anti rattling devices particularly adapted for automobile doors and has for its object to provide a device of this character so constructed that the same will be practically concealed from view and at the same time so constructed that the rattling or squeaking incident to vibration as the vehicle moves over rough ground will be prevented from causing the automobile door to squeak or rattle.

A further object is to provide an antirattling device for automobile doors comprising a cylinder adapted to be embedded in the door frame rabbet, said cylinder having a spring pressed plunger, which plunger normally when the door is open is held outwardly in the rabbet and adapted to be forced inwardly when the door is closed so that said door will be prevented from rattling. Also to provide an engaging plate for said plunger head which plate tapers downwardly and outwardly and is carried by the marginal edge of the door, said inclined engaging surface of the plate causing the plunger head when the door is closed to normally work toward the thin end of the plate, thereby having a tendency to raise the door at its free end incident to the twisting of the body frame during travel or to take up any looseness in the door hinges, thereby preventing rattling in a vertical plane.

With the above and other objects in view the invention resides in the combination and arrangement of parts as hereinafter set forth, shown in the drawings described and claimed, it being understood that changes in the precise embodiment of the invention may be made within the scope of what is claimed without departing from the spirit of the invention.

In the drawings:—

Figure 1 is a perspective view of an automobile door and door frame showing the device applied thereto.

Fig. 2 is a detail sectional view through the plunger cylinder and a portion of the door frame in which it is disposed, also through the engaging wedge and a portion of the door.

Fig. 3 is a plan view of the wedge.

Fig. 4 is an end view of the plunger carrying cylinder.

Fig. 5 is a modified form of the device showing the same used as a securing means for the automobile hood.

Referring to the drawings, the numeral 1 designates a conventional form of automobile body and 2 a door opening therein. The door opening is of a conventional type and is provided with a rabbet 3 for the reception of the free end 4 of a conventional form of door 5, there being a conventional form of lock bolt 6 carried by the door 5 and a keeper 7 carried by one wall of the door opening 2.

The flange 8 of the door opening 2 is provided with a cylindrical bore 9, in which a cylinder 10 is disposed, the rear end of said cylinder being closed as at 11 and provided with an axially disposed aperture 12, in which aperture a plunger bolt 13 is slidably mounted. Cylinder 10 at its forward end is provided with a flange 14 which is disposed in a recess 15, so that the outer end of the cylinder will be flush with the outer face of the flange 2. Plunger rod 13 at its forward end is provided with an enlarged head 16, the outer end of which is convexed as at 17 and is adapted to engage the downwardly and outwardly inclined surface 17ª of a wedge 18 carried by the door when said door is closed. Wedge 18 is disposed in a recess 19 of the door and is secured therein by means of screws 20. Surrounding the plunger rod 13 and disposed within the cylinder 15 is a coiled spring 21, which spring is an expansible spring and engages the closed end 11 and the enlarged portion 16 of the plunger rod 13 thereby holding the enlarged head 16 outwardly so that its convexed end 17 will be disposed in the rabbet 3 of the door opening when the door is open, the outward movement of the convexed end 17 being limited and adjusted by means of nuts 21 threaded on the rear end of the plunger rod 13.

It will be seen that when the door is closed and the bolt 6 and keeper 7 are in engagement with each other that the plunger will be forced inwardly by the engagement of the inclined surface 17ª with the convexed end 17 of the plunger enlargement thereby compressing the spring so that its tension will prevent the door from rattling incident to the vibrations of the vehicle. However, it will also be seen by inclining the surface 17ª downwardly and outwardly that the tendency will be for the free end of the door to be supported free from the horizontal portion of the rabbet 3 of the door opening thereby preventing rattling of the door on the bottom of the rabbet, this being particularly advantageous in cases where the hinges have any play, for the reason that the tendency of the wedge and spring actuated plunger is to raise the door to its maximum raised position incident to vibration.

Referring to Fig. 5 the spring actuated plunger is in this form shown in a position for holding the marginal edge of the pivoted portion of automobile hood. In this form the cylinders 10 are disposed between spaced lugs 10ª which may be carried by the side bars of an automobile frame. Secured to the hood section 10ᵇ on each side thereof are wedges 10ᶜ, which are adapted to move down between the convexed ends 17 of the plungers so that said wedges after they pass between the convexed ends will have their shoulders 10ᵈ disposed below the convexed ends 17 of the plunger, which ends will hold the portion 10ᵇ of the hood in position.

Although the above devices have been described to be applied to a door where it is preferable that the same be used, it is to be understood that the same may be applied to the bottom of the door or to other squeaking and rattling parts of an automobile.

The invention having been set forth what is claimed as new and useful is:—

An anti rattling device for automobile doors and the like, said device comprising a spring actuated member located on the door frame, said spring actuated member being so positioned that when the door is closed it will be forced inwardly against the action of its spring and an inclined plate carried by the door and adapted to engage the spring actuated member so that said door will be prevented from vibrating.

In testimony whereof I have signed my name to this specification in the presence of two subscribing witnesses.

TRUMAN J. MARTIN.

Witnesses:
H. A. SCHANTZ,
MINNIE H. BECKER.